Figure 1:
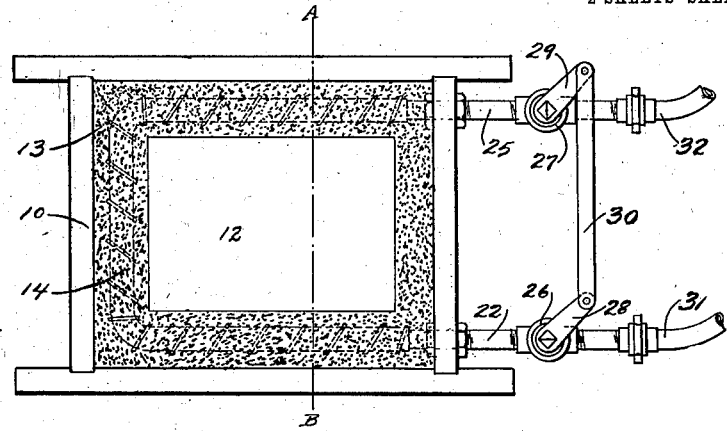

S. DAVIDSON.
PROCESS FOR DRYING ARTIFICIAL STONE OR WET MOLDS.
APPLICATION FILED OCT. 16, 1911. RENEWED AUG. 7, 1913.

1,090,387.

Patented Mar. 17, 1914.

2 SHEETS—SHEET 1.

WITNESSES:
Walter H. Kelley
Bessie E. Dempsey

INVENTOR
Samuel Davidson
BY
ATTORNEY

S. DAVIDSON.
PROCESS FOR DRYING ARTIFICIAL STONE OR WET MOLDS.
APPLICATION FILED OCT. 16, 1911. RENEWED AUG. 7, 1913.

1,090,387.

Patented Mar. 17, 1914.
2 SHEETS—SHEET 2.

WITNESSES:
Walter A. Kelley
Bessie E. Dempsey.

INVENTOR
Samuel Davidson
BY J. W. M. Ellis
ATTORNEY

UNITED STATES PATENT OFFICE.

SAMUEL DAVIDSON, OF BUFFALO, NEW YORK, ASSIGNOR, BY DIRECT AND MESNE ASSIGNMENTS, TO BUFFALO CEMENT STONE COMPANY, OF BUFFALO, NEW YORK, A CORPORATION OF ARIZONA.

PROCESS FOR DRYING ARTIFICIAL STONE OR WET MOLDS.

1,090,387.  Specification of Letters Patent.  Patented Mar. 17, 1914.

Application filed October 16, 1911, Serial No. 654,967. Renewed August 7, 1913. Serial No. 783,609.

*To all whom it may concern:*

Be it known that I, SAMUEL DAVIDSON, a citizen of the United States of America, residing at Buffalo, in the county of Erie and State of New York, have invented certain new and useful Improvements in Processes for Drying Artificial Stone or Wet Molds, of which the following is a full, clear, and exact description.

My process is adapted for drying sand molds of any kind but for convenience, I have shown and described it for drying artificial stone and the molds for the same.

As is well known, the most successful and desirable method of making artificial stone is by what is termed the wet process. In this process the cement mixture has added to it sufficient water to give it a consistency such that it may be poured into dry sand molds. This dry sand absorbs the superfluous water and thus leaves the artificial stone so that it can dry or cure. This, however, takes a very long time and makes a large amount of factory floor space necessary.

The general object of my invention has been to provide a process whereby this superfluous water and moisture may be very rapidly carried off from the artificial stone and the sand surrounding the same, thereby saving a great deal of time and also economizing in floor space, whereby a larger output is made possible.

Furthermore, I have sought to provide a process whereby the molding sand may be kept in better condition and used longer than has been possible with other processes.

In carrying out my process, any suitable device may be employed, but I have shown in the accompanying drawings, several forms of apparatus which I have found in practice to be best suited to carry out my process, but I do not wish to limit myself to the exact form shown, as any other form embodying the essence of those shown may be used without departing from the spirit of my invention.

Figure 2:
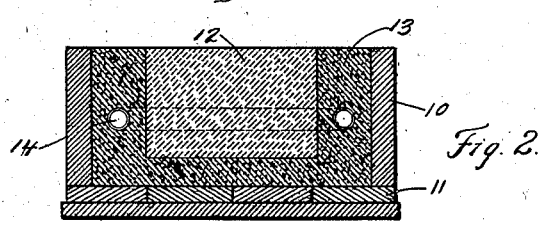
Figure 3:
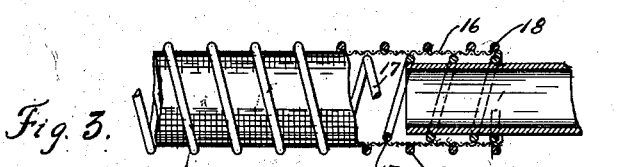
Figure 4:
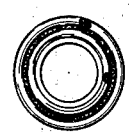
Figure 5:
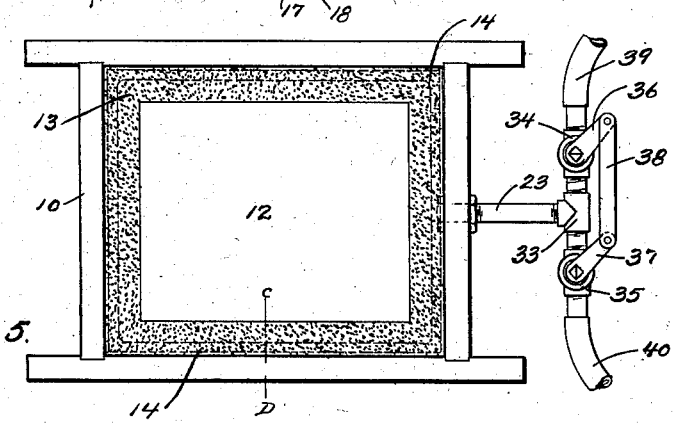
Figure 6:
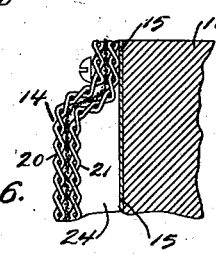
Figure 7:
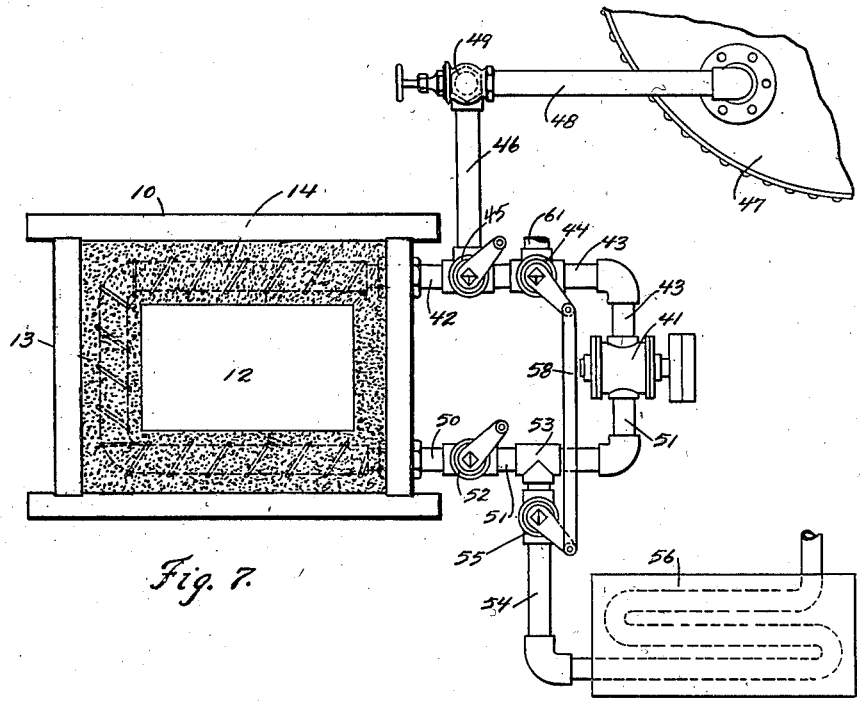
Figure 8:
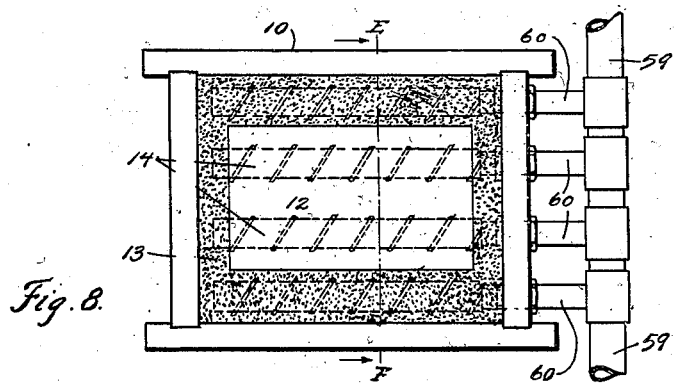
Figure 9:
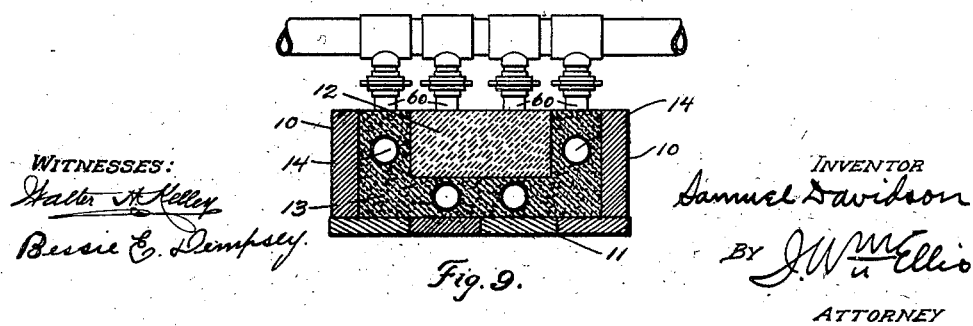

In the drawings, like characters of reference indicate like parts throughout the several views of which:

Figure 1 shows a plan view of one form of device embodying my invention. Fig. 2 is a sectional view of the same taken on line A—B of Fig. 1. Fig. 3 is an enlarged fragmental view of the fabric filter used in carrying out my process. Fig. 4 is an end view of the same. Fig. 5 is a plan view of a modified form of device. Fig. 6 is a fragmental sectional view taken on line C—D of Fig. 5. Fig. 7 shows a plan view of a modified form of device for carrying out my invention. Fig. 8 shows a plan view of another modified form of device. Fig. 9 shows a sectional view of the device shown in Fig. 8 and is taken on line E—F of that figure.

In the drawings the numeral 10 represents a molding flask, and 11 represents a molding board.

12 represents the concrete mixture, forming the artificial stone, after it has been cast or poured into the mold.

13 is the molding sand in which the mold is formed.

In carrying out my process, I provide a fabric filter. This filter is disposed in the sand mold and may be of any suitable shape. In Figs. 1–4 and 7–9, I have shown these filters 14 in the form of a hose while in Figs. 5 and 6 I show the filter 14 of rectangular shape. When in the form shown in these last mentioned figures, I preferably secure the filter to the inside of the flask 10 and on top of a sheet of thin metal 15 (Fig. 6). The filter which is shown in Fig. 3, is formed of a tube 16 made of porous fabric on the inside of which is disposed a helical spring 17 and on the outside a helical spring 18. These springs insure the fabric tube against collapsing when a vacuum is drawn and against bursting when pressure is applied. Secured inside the helical spring 18 and at the ends of the filter, are pipes 22 and 25 (Fig. 1) by which the filter is connected up with suitable pipes.

In the form shown in Fig. 6 the fabric 19 is disposed between a wire screen 20 on the outside and a like wire screen 21 on the inside. This form provides a continuous compartment 24 extending entirely around the inside of the flask 10 and a pipe 23 (Fig. 5) is run through one side of the flask and opens into the said compartment.

The pipes 22 and 25 have secured at the outer ends thereof stop cocks 26 and 27, respectively. Connecting the arms 28 and 29 of the said stop cocks is a link 30 by which they may be operated in unison. Connected in a detachable manner to the stop cock 26 is preferably a vacuum hose 31 and connected to the stop cock 27 is preferably a pressure hose 32.

In the form shown in Fig. 5, I preferably secure to the outer end of the pipe 23 a T fitting 33 to which is secured by suitable pipes, stop cocks 34 and 35 provided with arms 36 and 37, respectively. These arms are connected together by means of the link 38. Secured in a detachable manner to the stop cock 34 is a vacuum hose 39 and secured in a like manner to the stop cock 35 is a pressure hose 40.

Referring now to Fig. 7 where I show a modified form of connection, 41 represents a rotary pump and connecting the pressure side thereof with the filter pipe 42 is a suitable pipe 43. In this pipe is a three-way stop cock 45 and a three-way stop cock 44, having arranged at its branch, an air discharge pipe 61. The stop cock 45 is nearest the flask 10 and it has a steam pipe 46 connected to the branch thereof. 47 represents a fragmental plan of a steam boiler and connecting it to the steam pipe 46 is a line of pipe 48 in which is preferably placed a valve 49. Connecting the suction side of the rotary pump 41 with the filter pipe 50 is a suitable pipe 51 and in this pipe is placed a stop cock 52 and a T fitting 53. Running from the branch of the T 53 is pipe 54, in which is placed a stop cock 55. 56 represents an air heater of any suitable style which is connected with the pipe 54. Obviously when cold air is desired, the heater may be left cold and air may be drawn through the same without being heated. Connecting the arms of the stop cocks 44 and 55 is a link 58, whereby the stop cocks connected by these links may be operated in unison.

In Figs. 8 and 9 I have shown a modified form of filter and connection thereto. Here I use a plurality of hose shaped fabric filters 14 disposed one on each side of the mold 12 and two beneath the same. 59 is a manifold and may extend along any number of molds and have a vacuum and pressure connection thereto. Connecting each of the filters 14 with this manifold are suitable detachable connections 60.

When carrying out my process by the devices herein shown and described, I mold the pattern for the artificial stone and cast the fluid concrete mixture in the usual manner but while molding the pattern I insert the fabric filter in the sand as shown except in the device shown in Fig. 5 and Fig. 6, where the filter 14 remains stationary.

Referring now more particularly to Fig. 1, after the cement mixture has been poured the vacuum hose 31 is connected to any suitable source for drawing a vacuum and the pressure hose 32 is connected preferably to any suitable source of steam supply. The link 30 is now moved to the position shown in Fig. 1, when the stop cock 26 is open and the stop cock 27 is closed. The filter 14 will now be evacuated and some of the moisture in the sand will be drawn off. The stop cocks are held in this position for a very short time only when the link 30 is moved so as to open the steam stop cock 27 and close the vacuum stop cock 26. The steam now enters the filter, blowing out the sand that has been drawn into the fabric in the filter and heats the sand and concrete mixture and causes the moisture therein to become vaporized. The steam is applied for a very short time when it is shut off and the vacuum stop cock 26 is again opened, whereupon the said vapor from the sand and concrete mixture will be drawn off. This operation is repeated in quick succession until the concrete mixture becomes skin or surface dried. After the concrete has become skin dried the sand is removed from around the concrete and the same is allowed to air dry While I have described the operation of the device shown in Fig. 1, it will be understood that this operation is similar to that of all the forms shown except that of the one shown in Fig. 7. Obviously, in place of using steam to clean the filter, heated air or even cold air under pressure may be used. This is more clearly shown in Fig. 7 and the operation of the device there shown is as follows: The stop cocks as shown are so arranged that when the pump 41 is revolved, air either heated or cold will be drawn through the pipe 54, stop cock 55, T 53, pipe 51, pump 41, pipe 43, stop cocks 44 and 45 and into the filter 14. When starting my process with the device shown in this figure, I operate the link 58 so as to close stop cock 55 and move stop cock 44 to a position where the air in the pipe 43 will be discharged from pipe 61 and I also open stop cock 52. With the stop cocks set as just described, air will be drawn from the filter and mold and through the filter pipe 50, stop cock 52, pipe 51, pump 41, pipe 43, stop cock 44 and discharged from the pipe 61. When it is desired to use steam instead of cold or heated air, the stop cock 52 is closed and the three-way stop cock 45 operated so that steam will be carried from the pipe 46 to the pipe 42 and the filter 14 connected thereto.

In the drawings, I have shown devices with single-part flasks only, but obviously, my process may be carried out with a multiple-part flask and the filters may be placed in any part of the flask desired. The connections from the filters to the stop cocks or manifolds may be either of pipe or of rubber hose and many other modifications from the devices herein shown and described may be made without departing from the spirit of my invention.

Obviously, while I show and describe my process as used in drying artificial stone and artificial stone molds, it may be used to great advantage in skin drying brass, iron and steel molds which is in the scope of the appended claims.

Having thus described my invention, what I claim is:

1. The process of drying artificial stone or wet molds which consists in filtering the moisture from said stone into the molding sand and then extracting said moisture from said molding sand through a filter by mechanical means.

2. The process of drying artificial stone or wet molds which consists in filtering the moisture from said stone into the molding sand, then extracting said moisture from said molding sand through a filter by mechanical means, and then forcing a fluid under pressure into said filter and through said sand, whereby said filter is kept clean and free from clogging deposits.

3. The process of drying artificial stone or wet molds which consists in filtering the moisture from said stone into the molding sand, then extracting said moisture from said molding sand through a filter by mechanical means, and then forcing a heated fluid under pressure into said filter and through said sand whereby the moisture is vaporized and the said filter is kept clean and free from clogging deposits.

In testimony whereof, I have hereunto set my hand in the presence of two subscribing witnesses.

SAMUEL DAVIDSON.

Witnesses:
J. E. DENNIS,
J. WM. ELLIS.